(12) United States Patent
Olson et al.

(10) Patent No.: US 6,558,795 B2
(45) Date of Patent: May 6, 2003

(54) STRIPPABLE COATING SYSTEM

(75) Inventors: Keith E. Olson, Apple Valley, MN (US); Victoria Jeanne Jackson, Lakeville, MN (US)

(73) Assignee: Ecolab Inc., St. Paul, MN (US)

( * ) Notice: Subject to any disclaimer, the term of this patent is extended or adjusted under 35 U.S.C. 154(b) by 25 days.

(21) Appl. No.: 09/838,873

(22) Filed: Apr. 20, 2001

(65) Prior Publication Data

US 2003/0027010 A1 Feb. 6, 2003

(51) Int. Cl.$^7$ ............................................... B32B 27/38
(52) U.S. Cl. .................. 428/413; 428/424.2; 428/425.1; 428/483; 428/481; 428/515; 428/535; 428/536; 428/537.1; 522/84; 522/182; 522/183; 526/318.3
(58) Field of Search .............................. 428/535, 536, 428/537.1, 515, 481, 483, 424.2, 425.1, 413; 522/84, 182, 183; 526/318.3

(56) References Cited

U.S. PATENT DOCUMENTS

| | | | |
|---|---|---|---|
| 3,867,300 A | 2/1975 | Karabinos et al. | 514/558 |
| 4,414,128 A | 11/1983 | Goffinet | 510/405 |
| 4,517,330 A | 5/1985 | Zdanowski et al. | 524/408 |
| 4,592,787 A | 6/1986 | Johnson | 134/38 |
| 4,891,073 A | 1/1990 | Shortt et al. | 134/20 |
| 5,007,969 A | 4/1991 | Doscher | 510/118 |
| 5,075,348 A | 12/1991 | Revis et al. | 522/84 |
| 5,080,822 A | 1/1992 | VanEenam | 510/365 |
| 5,080,831 A | 1/1992 | VanEenam | 510/365 |
| 5,158,710 A | 10/1992 | VanEenam | 252/264 |
| 5,319,018 A | 6/1994 | Owens et al. | 510/556 |
| 5,342,551 A | 8/1994 | Ruckle | 134/34 |
| 5,419,848 A | 5/1995 | VanEenam | 510/365 |
| 5,453,451 A | 9/1995 | Sokol | 522/42 |
| 5,529,887 A | 6/1996 | Horn et al. | 430/331 |
| 5,585,341 A | 12/1996 | Van Eenam | 510/365 |
| 5,637,559 A | 6/1997 | Koreltz et al. | 510/201 |
| 5,744,440 A | 4/1998 | Liu | 510/362 |
| 5,773,487 A | 6/1998 | Sokol | 522/42 |
| 5,786,319 A | 7/1998 | Pedersen et al. | 510/423 |
| 5,811,383 A | 9/1998 | Klier et al. | 510/417 |
| 5,830,937 A | * 11/1998 | Shalov et al. | 524/297 |
| 5,849,682 A | 12/1998 | Van Eenam | 510/254 |
| 5,854,187 A | 12/1998 | Blum et al. | 510/197 |
| 5,922,665 A | 7/1999 | Liu | 510/365 |
| 5,972,874 A | 10/1999 | Libutti et al. | 510/417 |
| 5,977,042 A | 11/1999 | Hernandez et al. | 510/201 |
| 6,010,995 A | 1/2000 | Van Eenam | 510/365 |

FOREIGN PATENT DOCUMENTS

| | | |
|---|---|---|
| DE | 198 11 386 A1 | 9/1999 |
| EP | 0 270 888 A2 | 11/1987 |
| EP | 0 437 327 A2 | 4/1991 |
| EP | 0 507 633 A2 | 10/1992 |
| EP | 0 270 888 A2 | 1/1997 |
| GB | 2 173 508 A | 10/1986 |
| WO | WO 94/22965 | 10/1994 |
| WO | WO 97/18285 | 5/1997 |
| WO | WO 98/11168 | 3/1998 |
| WO | WO 00/20518 | 4/2000 |
| WO | WO 00/52105 | 9/2000 |
| WO | WO 01 14481 A1 | 3/2001 |

OTHER PUBLICATIONS

Product Information Sheet, "*Solder Seal® Gunk® Hydroseal II Heavy Duty Cold Parts Cleaner,*" Radiator Specialty Company, Charlotte, NC (Mar. 1997).
Material Safety Data Sheet for 'Upper Limits,' Spartan Chemical Company, Inc., Jan. 12, 1990.
Material Safety Data Sheet for 'Hydro Seal II Heavy Duty Cold Parts Cleaner,' Radiator Specialty Company, Aug. 1998.

\* cited by examiner

*Primary Examiner*—Leszek Kiliman
(74) *Attorney, Agent, or Firm*—IPLM Group, P.A.

(57) ABSTRACT

A radiation curable coating contains an agent that imparts greater strippability to the cured coating. The agent can be included in the coating or in one or more subsequently applied maintenance coats.

57 Claims, 1 Drawing Sheet

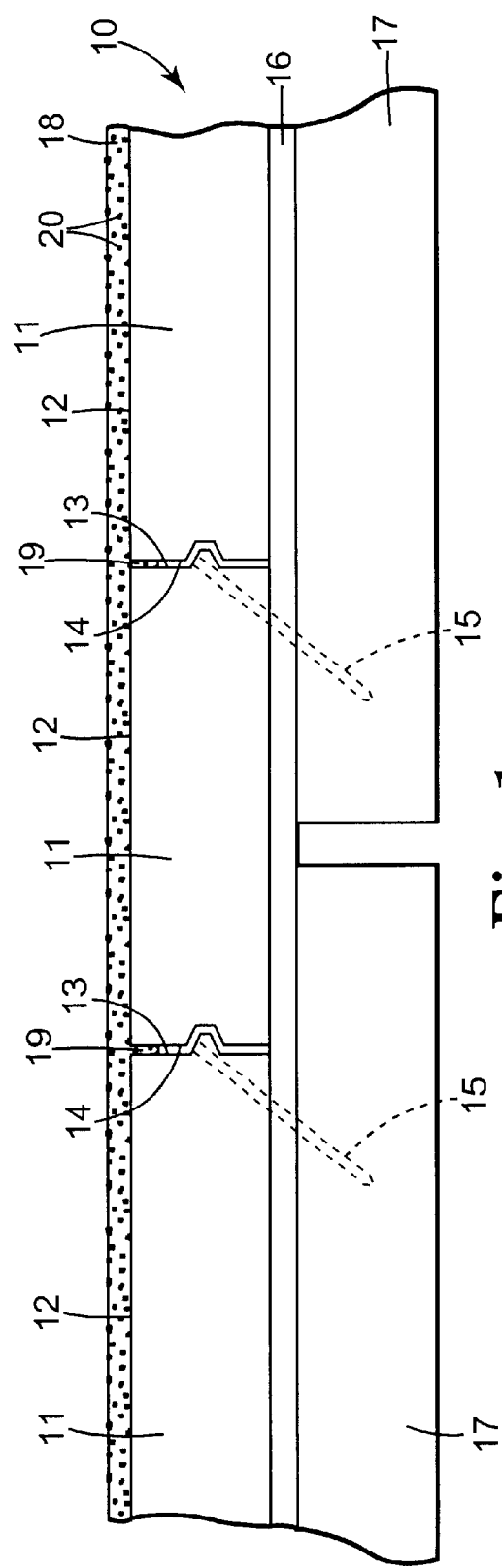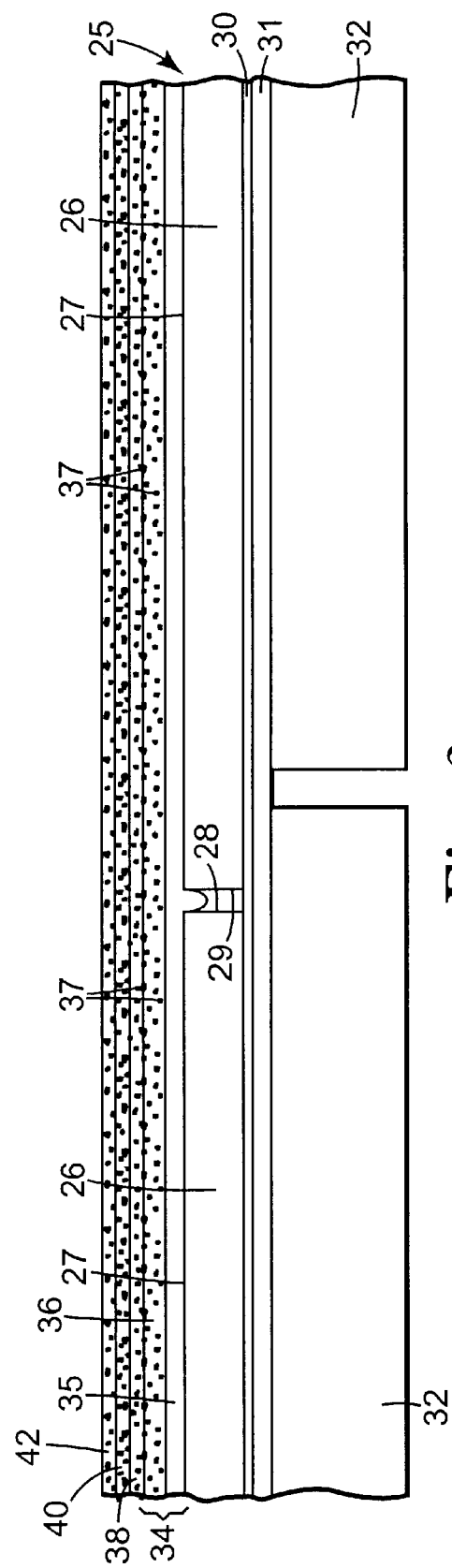

STRIPPABLE COATING SYSTEM

TECHNICAL FIELD

This invention relates to strippable coatings, and methods for applying and for removing a coating.

BACKGROUND

Radiation curable (e.g., UV curable) coating compositions typically provide a desirable combination of properties including rapid cure, low or no solvent content, high gloss and good durability. Due to these properties and their generally good scratch and detergent resistance, UV curable coating compositions have been used as floor finishes. UV curable urethanes have been factory-applied to solid wood flooring to provide a pre-finished flooring material, and have been jobsite-applied to installed flooring materials to provide a substantially continuously-coated floor.

When radiation cured floor coatings become dulled, they can sometimes be restored to an acceptable appearance by applying one or more additional coats (usually referred to as "maintenance" coats) of radiation curable floor coating. Eventually even application of a maintenance coat will not restore an adequate appearance, and the entire floor finish will need to be removed and renewed. Unfortunately, current commercially available radiation cured floor coatings are very difficult to remove using chemical strippers. Instead, more aggressive removal techniques such as floor sanding may be employed, thereby leading to removal of a portion of the underlying floor surface and creating dust issues at the jobsite. This has discouraged the use of radiation cured floor coatings.

SUMMARY OF THE INVENTION

The present invention provides, in one aspect, a radiation curable coating comprising an agent that imparts greater strippability to the cured coating. The agent can be included in a first coat of radiation curable coating atop a substrate, or in one or more subsequently applied maintenance coats, or in both the first coat and one or more maintenance coats. The agent not only facilitates the eventual removal of the cured coating using a chemical stripper, but also can enhance adhesion of the maintenance coat to a previously applied coating.

The present invention also provides strippable radiation curable coating kits for jobsite application to flooring and other substrates, and methods for applying radiation curable coatings to flooring and other substrates.

The radiation curable coatings of the present invention can be maintained using repeated application of radiation curable maintenance coats, but can be stripped without damaging the underlying substrate.

BRIEF DESCRIPTION OF THE DRAWING

FIG. 1 shows a side view of a flooring material coated with a strippable single layer coating of the invention.

FIG. 2 shows a side view of a flooring material coated with a strippable laminate coating of the invention.

DETAILED DESCRIPTION

The coatings of the present invention can be applied to flooring materials or other substrates as one or more coats of the same material, or as one or more coats of different materials. In a preferred embodiment, the cured coatings of the present invention are in the form of a laminate comprising a readily strippable intermediate coating atop the substrate, a radiation cured overcoat atop the intermediate coating, and optionally one or more radiation cured maintenance coats atop the overcoat. Whether applied as one or as more than one coats of the same material, or two or more coats of different materials, at least one layer of the radiation curable coatings of the present invention comprises an agent that imparts greater strippability to the cured coating.

As used in connection with this invention, a coating is regarded as being "strippable" if when subjected to the action of a suitable stripper, the coating can readily be removed from the substrate using simple, non-abrasive measures such as a mop and detergent solution, or mildly abrasive but substrate-non-damaging measures such as a nonwoven floor scrub pad. Strippability preferably is evaluated using the Strippability Scale and test method set out below in Example 1. The agent is regarded as imparting greater strippability to a coating if the cured coating exhibits a higher Strippability Scale rating than a cured control coating that did not contain such an agent.

As used in connection with this invention, an undried coating material is regarded as being waterborne when the coating material contains more than trace amounts (e.g., more than about 5 wt. %) of water. Preferably, such waterborne coating materials will be emulsions, suspensions, dispersions or solutions in water, and will be substantially free of volatile organic solvents. We will also use the term waterborne to refer to dried coatings that were waterborne before they were dried.

As used in connection with this invention, an overcoat is regarded as being "adhered" to an intermediate coating when the overcoat exhibits at least 50% adhesion when evaluated using the Adhesion Loss Test described in Example 2.

As used in connection with this invention, an overcoat is regarded as being "strip agent-permeable" if when coated atop a desired readily strippable intermediate coating, dried and subjected to the action of a suitable strip agent, the strip agent permeates or otherwise penetrates the overcoat sufficiently so that both the overcoat and strippable intermediate coating can be removed from the substrate. Strip agent permeability can be enhanced by a mechanically roughening the overcoat (using, for example, a nonwoven floor scrub pad, brush or other mild abrasive measure) just prior to stripping. An overcoat will be regarded as being strip agent-permeable even if such mechanical roughening is required, so long as the required mechanical roughening does not damage the underlying substrate.

As used in connection with this invention, an overcoat is regarded as being more wear resistant than an underlying strippable intermediate coating when the dried overcoat exhibits lower weight loss than the dried intermediate coating using a Taber Abrasion test conducted according to ASTM D4060-95.

A variety of substrates can be coated with the radiation curable coatings of the invention. For example, flooring materials that can be coated include resilient materials such as vinyl flooring, vinyl composite flooring, and synthetic sports floors; and non-resilient materials such as concrete, marble, wood, ceramic tile and grout, terrazzo, and polymeric substrates such as vinyl esters and polyesters. Other substrates that can be coated include walls, ceilings, labels, emblems, indoor and outdoor signs, and vehicles such as automobiles. The coatings can be applied at a variety of jobsites, including indoor and outdoor sites involving new or existing residential, commercial and government-or agency-owned sites.

The coatings of the present invention can be "jobsite-applied" to flooring or other multi-piece substrates, especially wood and vinyl tile substrates, after the substrate has been installed. They can also be "factory-applied" to flooring or other multi-piece substrates before the substrate pieces are installed at a jobsite, and later stripped from and reapplied to the installed substrate pieces after they have been subjected to wear.

FIG. 1 shows an end view of multi-piece flooring material 10 comprising floorboards 11. Each floorboard 11 has a top surface 12, sides surfaces 13 and 14, and additional side or end surfaces that are not shown in FIG. 1. Fasteners 15 (shown in phantom in FIG. 1) hold flooring material 10 in place on underlayment 16 and subfloor 17. UV cured coat 18 covers the top surfaces 12, and fills and seals at least the uppermost portions of the gaps 19 between each floorboard 11. When originally applied, coat 18 contained an agent that imparts greater strippability to cured coat 18. Coat 18 also contains inorganic particles 20 that enhance the durability of coat 18.

FIG. 2 shows an end view of multi-piece flooring material 25 comprising vinyl tiles 26. Each tile 26 has a top surface 27, sides surfaces 28 and 29, and additional side or end surfaces that are not shown in FIG. 1. Adhesive 30 holds tiles 26 in place on underlayment 31 and subfloor 32. UV cured laminate coating 34 includes a readily strippable intermediate coating 35 atop the tiles 26, a first UV cured coat 36 atop the intermediate coating 35, and three UV cured maintenance coats 38, 40 and 42 atop coat 36. When originally applied, coats 36, 38, 40 and 42 each contained an agent that imparted greater strippability to cured coating 34. Coats 36, 38, 40 and 42 also contain inorganic particles 37 that enhance the durability of each coat.

A variety of radiation curable materials can be employed in the present invention. These materials can be cured using a variety of suitable energy sources such as UV, IR or electron beam energy. UV curing energy is preferred for jobsite coating applications. Radiation curable materials that are waterborne are preferred, for environmental reasons, for both jobsite-applied and factory-applied applications. Suitable radiation curable materials include urethanes, acrylates, methacrylates, unsaturated polyesters, vinyl ethers, epoxies and blends or copolymers thereof (e.g., urethane acrylates). Waterborne UV curable acrylates and urethanes are preferred. Particularly preferred materials are described in copending U.S. patent applications Ser. No. 09/560,170, filed Apr. 28, 2000 and Ser. No. 09/642,395, filed Aug. 18, 2000, the disclosures of which are both incorporated by reference. Suitable commercially or experimentally available radiation curable materials include radiation curable acrylates, urethanes and urethane acrylates (including aliphatic polyester urethane acrylates) such as UV curable coatings from UV Coatings Limited; ULTRA BRITE II™ UV curable coating from Minuteman, International, Inc.; ROSHIELD™ 3120 UV curable acrylated latex coating from Rohm & Haas; NEORAD™ NR-3709 UV curable aliphatic urethane coating from Zeneca Resins; LAROMER™ PE 55W polyester acrylate, LR 8895 polyester acrylate, LR 8949 aliphatic urethane and LR 8983 aromatic urethane waterborne acrylic ester resins, all available from BASF Corp.; VIAKTIN™ VTE 6155 urethane acrylate, VTE 6165 polyester urethane acrylate, VTE 6166 polyester acrylate and VTE 6169 polyester urethane acrylate waterborne radiation curable resins, all available from Solutia Inc.; 98-283W urethane acrylate, available from Hans Rahn & Co.; and materials such as those described in U.S. Pat. Nos. 5,453,451, 5,773,487 and 5,830,937 and in PCT Published Patent Application No. 98/11168. If desired, two or more layers of different radiation curable materials can be employed in coatings of the invention, in order to optimize properties such as adhesion to the substrate or to a strippable intermediate coating, wear resistance, coating strippability, etc.

A variety of agents can be employed in the present invention. Without intending to be bound by theory, the agent may function as a chain transfer agent that reduces the molecular weight of the radiation cured coating, or may cause swelling or porosity in the radiation cured coating, or may cause some other factor to occur during or after cure. Whatever the mechanism, the agent facilitates an attack on the radiation cured coating by a stripper. Agents containing oxygen (e.g., alcohols, esters and aldehydes) are preferred, and agents having at least one phenyl group in suitably close proximity to one or more hydroxyl or aldehyde groups are most preferred. Suitable agents include benzyl alcohol, benzaldehyde, benzyl acetate, 1-butanol, 2-butanol, hexanol, 1-octanol, t-butyl alcohol and mixtures thereof, with t-butyl alcohol, benzyl alcohol, benzaldehyde and mixtures thereof being especially preferred.

The radiation curable coating should contain sufficient agent so that the cured coating will have enhanced strippability compared to a radiation cured coating that does not contain such agent. If desired, a relatively large amount of agent can be employed, so long as the other desired properties of the radiation curable coating are not unduly harmed by addition of the agent. Preferably, however, the radiation curable coating contains only a small amount of agent, e.g., about 0.1 to about 15 weight percent agent based on the weight of solids in the radiation curable material. More preferably, the radiation curable coating contains about 0.5 to about 8 weight percent agent, and most preferably about 0.5 to about 5 weight percent agent. At such low addition levels, the agent has at most a minor effect upon the viscosity of the uncured coating.

If desired, the radiation curable coating can contain one or more solvents. Such solvents (referred to herein as "diluting solvents") can be added to facilitate application of the radiation curable coating, e.g., to lower viscosity, improve substrate wetting or to provide a longer drying time. Suitable diluting solvents include water, acetamidophenol (specific gravity 1.027); acetanilide (specific gravity 1.219; water solubility<1%); acetophenone (specific gravity 1.0238; water solubility<1%); [2-acetyl-1-methylpyrrole (specific gravity 1.04); benzyl acetate (specific gravity 1.0515; water solubility<1%); benzyl benzoate (specific gravity 1.118; water solubility<1%); benzyloxyethanol (specific gravity 1.07; water solubility<1%); ethers or hydroxyethers such as ethylene glycol phenyl ether (specific gravity 1.104; water solubility 2.3%; commercially available as "DOWANOL PPh" from Dow Chemical Co.) and propylene glycol phenyl ether (specific gravity 1.063; water solubility 1.1%; commercially available as "DOWANOL PPh" from Dow Chemical Co.); essential oils (e.g., pinenes (alphas, betas, etc.), terpineols, terpinenes, carvone, cinnamealdehyde, borneol and its esters, citrals, ionenes, jasmine oil, limonene, dipentene, linalool and its esters), dibasic esters such as dimethyl adipate, dimethyl succinate, dimethyl glutarate (often available in a mix with specific gravities greater than 1.00; including products available under the trade designations DBE, DBE-3, DBE-4, DBE-5, DBE-6, DBE-9, DBE-IB, and DBE-ME from DuPont Nylon), dimethyl malonate, diethyl adipate, diethyl succinate, diethyl glutarate, dibutyl succinate, and dibutyl glutarate; dialkyl carbonates such as dimethyl carbonate, diethyl carbonate, dipropyl carbonate, diisopropyl carbonate, and dibutyl carbonate; and phthalate esters such as dibutyl phthalate, diethylhexyl phthalate, and diethyl phthalate; and mixtures thereof. Cosolvents can also be added if desired to assist in solubilizing the radiation curable coating. Suitable cosolvents include Butoxyethyl PROPASOL™, Butyl CARBITOL™ acetate, Butyl CARBITOL™ , Butyl CELLOSOLVE™ acetate, Butyl CELLOSOLVE™, Butyl DIPROPASOL™, Butyl PROPASOL™, CARBITOL™ PM-600, CARBITOL™ Low Gravity, CELLOSOLVE™ acetate, CELLOSOLVE™, Ester EEP™, FILMER IBT™, Hexyl CARBITOL™, Hexyl CELLOSOLVE™, Methyl CARBITOL™, Methyl CELLOSOLVE™ acetate, Methyl CELLOSOLVE™, Methyl DIPROPASOL™, Methyl PROPASOL™ acetate, Methyl PROPASOL™, Propyl CARBITOL™, Propyl CELLOSOLVE™, Propyl DIPROPASOL™ and Propyl PROPASOL™, all of which are available from Union Carbide Corp; and mixtures thereof. Water is an especially preferred diluting solvent. If desired, a relatively large amount of diluting solvent can be employed, so long as the other desired properties of the radiation curable coating are not unduly harmed by addition of the diluting solvent. Preferably, however, the radiation curable coating contains only a small amount of diluting solvent, e.g., 0 to about 12 weight percent diluting solvent based on the weight of solids in the radiation curable material. More preferably, the first coat of radiation curable coating contains 0 to about 7 weight percent diluting solvent, and most preferably about 2 to about 7 weight percent diluting solvent. Maintenance coats of the radiation curable coating are usually applied at similar or lower solids levels.

The radiation curable coatings can contain a variety of other ingredients. For example, the coating preferably contains one or more photoinitiators. Exemplary photoinitiators include, but are not limited to, 1-phenyl-2-hydroxy-2-methyl-1-propanone; oligo{2-hydroxy-2 methyl-1-[4-(methylvinyl)phenyl]propanone}; 2-hydroxy 2-methyl 1-phenyl propan-1 one; bis (2,6-dimethoxybenzoyl)-2,4,4-trimethylpentyl phosphine oxide; 2,4,6-trimethyl benzoyl-diphenyl phosphine oxide; 2-methyl-1-[4(methylthio)-2-morpholinopropan]-1-one; 1-hydroxycyclohexyl phenyl ketone; 4-(2-hydroxy) phenyl-2-hydroxy-2-(methylpropyl) ketone; 2,2-dimethoxy-2-phenyl acetophenone; benzophenone; benzoic acid; (n-5,2,4-cyclopentadien-1-yl) [1,2,3,4,5,6-n)-(1-methylethyl) benzene]-iron(+) hexafluorophosphate; 4-(dimethyl amino)-ethyl ether; and mixtures thereof. Commercially available photoinitiators include 1-hydroxycyclohexylphenylketone (IRGACURE™ 184, commercially available from Ciba Specialty Chemicals); a 50:50 weight basis mixture of 1-hydroxycyclohexylphenylketone and benzophenone (IRGACURE 500, commercially available from Ciba Specialty Chemicals); bis(n,5,2,4-cyclopentadien-1-yl)-bis[2,6-difluoro-3-(1H-pyrol-1-yl)phenyl]titanium (IRGACURE 784 DC, commercially available from Ciba Specialty Chemicals); 2-benzyl-2-N,N-dimethyl amino-1-(4-morpholinophenyl)-1-butanone (IRGACURE 369, commercially available from Ciba Specialty Chemicals); and the EB3, KB1, TZT, KIP 100F, ITX, EDB, X15 and KT37 series of ESACURE™ photoinitiators (commercially available from Sartomer Inc.). The radiation curable coating should contain sufficient photoinitiator to facilitate the desired rate and degree of photocuring without unduly harming storage stability. Preferably, the radiation curable coating contains about 0.05 to about 5 weight percent photoinitiator based on the weight of solids in the radiation curable material. More preferably, the radiation curable coating contains about 0.1 to about 3 weight percent photoinitiator, and most preferably about 0.5 to about 2 weight percent photoinitiator.

The radiation curable coating can contain a variety of adjuvants to alter the performance of properties of the coating before or after application to a substrate. Useful adjuvants include inorganic particles (discussed in more detail below), surface-active agents, defoamers, waxes, indicators, colorants, optical brighteners, UVA absorbers, light stabilizers and antioxidants. The types and amounts of such adjuvants will be apparent to those skilled in the art.

The radiation curable coating preferably contains inorganic particles that will enhance the abrasion, scratch or wear resistance of the coating. Suitable inorganic particles for use in the present invention include silicas and aluminas. Although the inorganic particles can if desired be obtained in dry powder form, preferably they are obtained in aqueous or solvent-based dispersions, as such dispersions are much more easily combined with radiation curable material. In general, solvent-based inorganic particle dispersions can easily be combined with both waterborne and solvent-borne radiation curable materials and generally provide good gloss and good film integrity in the cured coating. However, solvent-based inorganic particle dispersions tend to be more expensive than aqueous inorganic particle dispersions. When waterborne inorganic particle dispersions are combined with waterborne radiation curable materials, the resulting coating tends to have somewhat lower gloss and film integrity. We prefer to combine a waterborne inorganic particle dispersion with a suitable dispersing solvent that will dissolve in or be miscible with both water and the radiation curable material, and that will help to disperse the inorganic particles in the radiation curable material. The resulting mixture of waterborne inorganic particles and dispersing solvent can be combined with the radiation curable material and mixed using a suitable mixing device such as a sonic mixer. Suitable inorganic particles are available in a wide variety of average particle diameters. Small diameter particles tend to provide better adhesion of the coating to the substrate, but also tend to be more expensive than large diameter particles. Large particles tend to provide better scratch resistance. Preferably, the average particle diameter is about 3 to about 50 nanometers, more preferably about 12 to about 50 nanometers. In some cases, use of a bimodal mixture of small and large diameter particles can provide a cured coating having an optimal balance of good coating properties with scratch resistance and durability. Silicas are particularly preferred inorganic particles, especially for use in waterborne coatings. Suitable silicas include fumed silicas such as AEROSIL™ OX-50 (40 nanometer average particle diameter silica available from Degussa-Hüls AG) and CABOSIL™ M5 (available from Cabot Corp.); stabilized silica sols such as KLEBOSOL™ 30H25 (25 nm average particle diameter proton stabilized waterborne colloidal silica sol having a ph of 2.2 and a 30% solids content, available from Clariant Corp.), KLEBOSOL 30H50 (50 nm average particle diameter proton stabilized waterborne colloidal silica sol having a pH of 2.5 to 3.0 and a 30% solids content, available from Clariant Corp.), KLEBOSOL 30N12 (12 nm average particle diameter ammonium ion stabilized waterborne colloidal silica sol having a pH of 9.5 to 10.5 and a 30% solids content, available from Clariant Corp.), KLEBOSOL 30N25 (25 nm average particle diameter ammonium ion stabilized waterborne colloidal silica sol having a pH of 9.6 and a 30% solids content, available from Clariant Corp.), NALCO™ 1034A (20 nanometer average particle diameter acidic colloidal silica sol having a pH of 2.8 and a 34% solids content, available from Nalco Chemical Co.), NALCO 1130 (8 nanometer average particle diameter alkaline colloidal silica sol having a pH of 10.0 and a 30% solids content, available from Nalco Chemical Co.) and NALCO 1140 (15 nanometer average particle diameter alkaline colloidal silica sol having a pH of 9.4 and a 40% solids content, available from Nalco Chemical Co.); Silica organosols such as NALCO 1057 (20 nanometer average particle diameter colloidal silica sol having a 30% solids content in ethanol, available from Nalco Chemical Co.), HIGHLINK™ OG 1-32 (25 nm average particle diameter silica organosol having a 30% solids content in ethylene glycol, available from Clariant Corp.), HIGHLINK OG 401-31 (13 nm average particle diameter silica organosol having a 30% solids content in ethylene glycol mono n-propyl ether, available from Clariant Corp.) and HIGHLINK OG 401-51 (25 nm average particle diameter silica organosol having a 50% solids content in ethyleneglycol mono n-propyl ether, available from Clariant Corp.); colloidal silicas such as LUDOX™ AM, LUDOX AM-30 (12 nm average particle diameter aqueous silica sol having a 30% solids content), LUDOX AS, LUDOX HS40, LUDOX LS, LUDOX TM and LUDOX TMA (22 nm average particle diameter aqueous silica sol having a 34% solids content), all available from DuPont Silica Products); and spherical silicas such as the MONOSPHER™ series available from EM Industries, Inc. Suitable aluminas include Aluminum Oxide C (available from Degussa-Hüls AG) and KLEBOSOL 30CAL25 alumina modified colloidal silica (available from Clariant Corp.). The radiation curable coating should contain sufficient inorganic particles to provide increased scratch resistance compared to a radiation cured coating that does not contain inorganic particles. If desired, large amounts of inorganic particles can be employed, so long as the other properties of the radiation curable coating are not unduly harmed by the thickening effect or loss of gloss caused by addition of the inorganic particles to the radiation curable material. Preferably, the radiation curable coating contains about 1 to about 40 weight percent inorganic particles based on the weight of solids in the radiation curable material. More preferably, the radiation curable coating contains about 2 to about 20 weight percent inorganic particles, and most preferably about 5 to about 15 weight percent inorganic particles.

As mentioned above, the coating can be a laminate comprising the radiation curable coating atop a readily strippable intermediate coat. By "readily strippable", we mean that when the intermediate coating material is coated alone on a vinyl composite tile substrate at a coating weight of at least 10 g/m$^2$ and evaluated using the Strippability Scale set out below in Example 1, the hardened intermediate coating will have a Strippability Scale rating of 6 or more. A variety of intermediate coating materials can be employed. Preferred intermediate coating materials are strippable using a stripper that is capable of permeating the cured radiation curable coating. Thus, the choice of intermediate coating material may be determined in part by the chosen radiation curable coating and stripper. When the intermediate coating and the radiation curable coating are each coated alone on a vinyl composite tile substrate and evaluated using the Strippability Scale set out below in Example 1, the hardened intermediate coating desirably should have a higher strippability rating than the radiation cured coating. Preferably, there will be at least a 1 point differential, more preferably at least a 2 point differential, and most preferably at least a 4 point differential in observed Strippability Scale ratings between the hardened intermediate coating and radiation cured coating. Waterborne intermediate coating materials are preferred for ease of application. Water-soluble acid-containing polymers crosslinked using transition metals (e.g., metal crosslinked acrylics) are a particularly preferred class of intermediate coating materials. These can be stripped using a variety of strippers that dissolve or otherwise attack the intermediate coating. Waterborne urethane-based coatings (optionally used without the crosslinkers normally employed with such coatings) are another preferred class of intermediate coating materials. Suitable commercially available intermediate coating materials include PADLOCK™, GEMSTAR LASER™ and TAJ MAHAL™ acrylic floor finishes from Ecolab Inc.; CORNERSTONE™ and TOPLINE™ acrylic floor finishes from 3M; HIGH NOON™ acrylic finish from Butchers; CITATION™ acrylic finish from Buckeye International, Inc., COMPLETE™, SIGNATURE™, TECHNIQUE™ and VECTRA™ acrylic floor finishes from SC Johnson Professional Products; SPLENDOR™, DECADE™, PRIME SHINE™ ULTRA and PREMIER™ acrylic finishes and FORTRESS™ urethane acrylic finish from Minuteman, International, Inc.; UPPER LIMITS™ acrylic finish from Spartan Chemical Co.; blends of the above-mentioned ROSHIELD acrylate coating with styrene maleic anhydride polymer as described in PCT Published Patent Application No. 98/11168; and materials such as those described in U.S. Pat. Nos. 4,517,330 and 5,319,018 and the patents cited therein. Suitable commercially available urethane floor finishes include COURTMASTER II™ urethane floor finish from Ecolab Inc. Strippable floor coatings designated as "sealers" (e.g., OVER AND UNDER™ floor sealer, available from S.C. Johnson Professional Products and ACRYL-KOTE™Seal and Finish and PREP Floor Seal from Minuteman, International, Inc.) and strippable coatings based on polyvinylacetates can also be used. Blends of coatings (e.g., up to 50 weight percent of a radiation curable coating with less than 50 weight percent of a non-radiation curable coating) can also be employed as intermediate coating materials. If desired, two or more layers of different intermediate coatings can be employed in laminate coatings of the invention, in order to optimize properties such as adhesion to the substrate or to the radiation curable coating, wear resistance, coating strippability, etc.

Suitable strippers include compositions containing phenyl alcohols (e.g., benzyl alcohol); glycol ethers (e.g., propylene glycol methyl ether; phenoxy ethanol; phenoxy propanol; and ETHYL CARBITOL™, BUTYL CARBITOL™ and BUTYL CELLOSOLVE™, all available from Union Carbide Corp.); metasilicates; alkanolamines (e.g., monoethanolamine); and caustic agents such as sodium or potassium hydroxide. Compositions containing phenyl alcohols are preferred for stripping laminate coatings employing acrylate or urethane radiation curable coatings owing to the relatively high rate at which phenyl alcohols penetrate such radiation curable coatings and their ease of use and low odor.

A particularly preferred stripper concentrate contains a polar solvent that is denser than water, and a sufficiently low level of cosolvent or surfactant so that upon mixing with water a pseudo-stable aqueous dispersion forms which will phase-separate following application to a surface, as described in copending U.S. patent application Ser. No. 09/641,775, filed Aug. 18, 2000, the disclosure of which is incorporated by reference.

Another preferred stripper concentrate contains about 1 to 75 wt. percent of an ether alcohol solvent having a solubility in water of less than about 5 wt. % of the solvent, and about 1 to 75 wt. % of an ether alcohol solvent/coupler having a solubility in water of about 20 to about 100 wt. % of the solvent/coupler, wherein the vapor pressure of the concentrate is less than 1 millimeter Hg. Concentrates of this type are described in copending application Ser. No. 09/383,000 filed Aug. 25, 1999, the disclosure of which is incorporated by reference.

Suitable commercially available strippers include HAWK™, FREEDOM™ and CARE STRIP LOW ODOR™ stripper concentrates from Ecolab Inc.; JUGGERNAUT™ stripper concentrate from Buckeye International, Inc.; and TWIST AND FILL™ stripper concentrate from 3M. Although no longer commercially available, an aqueous stripper concentrate previously sold in Canada as FULLER FORMULA 3100™ Super Concentrate (Fuller Brush, Quebec) can also be used in the present invention.

The intermediate coating (if employed) and stripper can contain a variety of adjuvants to alter their performance and properties before or after application to a substrate. Useful adjuvants for the intermediate coating or stripper include leveling agents and other surface-active agents, defoamers, diluting solvents, waxes, indicators, colorants optical brighteners, UVA absorbers, light stabilizers and antioxidants. The types and amounts of such adjuvants will be apparent to those skilled in the art.

The radiation curable coatings of the invention can be applied using a variety of methods, including spraying, brushing, roll coating and flood coating. Mop application is preferred for coating floors. Typically, the substrate should first be cleaned and any loose debris removed. One or more coats of the optional intermediate coating (diluted if necessary with water or another suitable diluting solvent) are applied to the substrate, and allowed to dry. One to five coats of the intermediate coating typically will be preferred for coating floors. When used on floors, each coat of the intermediate coating preferably will have a dry coating thickness of about 2.5 to about 75 micrometers, more preferably about 2.5 to about 20 micrometers, and the overall intermediate dry coating thickness preferably will be about 5 to about 150 micrometers, more preferably about 5 to about 40 micrometers.

Next, one or more coats of the radiation curable coating (diluted if necessary with water or another suitable diluting solvent) can be applied to the substrate (or to the optional intermediate coating if employed once the intermediate coating has dried to the touch). One to five coats of the radiation curable coating typically will be preferred for coating floors. Each coat of the radiation curable coating preferably is individually cured using a suitable radiation curing apparatus. When used on floors, each coat of the radiation curable coating preferably will have a dry coating thickness of about 2.5 to about 75 micrometers, more preferably about 2.5 to about 20 micrometers, and the overall radiation curable coating thickness after drying preferably will be about 5 to about 150 micrometers, more preferably about 5 to about 40 micrometers. When used on floors, laminate coatings of the invention preferably will have an overall dry coating thickness of about 10 to about 300 micrometers, more preferably about 10 to about 80 micrometers.

If a plurality of coats of the radiation curable coating are applied and cured in succession without exposing the coating to normal wear and tear between coats, the thus-applied layers can be regarded collectively as a "first coat". The hardened first coat can be exposed to normal wear and tear for an extended period of time. As with a conventional floor coating, durability and gloss retention can be prolonged by regular cleaning procedures (e.g., mopping). Eventually the coating will reach a stage at which one or more maintenance coats should be applied, or at which the coating should be removed and renewed. Maintenance coats can be applied using a procedure like that used for the first coat. The coating can be stripped by optionally abrading the coating with a suitably mild abrasive (e.g., a green or black SCOTCH-BRITE™ Floor Maintenance pad from 3M) and then applying a coating of the desired stripper. The stripper should be allowed to stand for a suitable time (e.g., for a minute or more, and typically between about 5 and about 20 minutes) while it permeates through the coating (and in case of a laminate coating, while it attacks, the intermediate layer). After the coating softens sufficiently, it can be removed using a variety of techniques including vacuuming, mopping or wiping. Removal will usually be made easier if water or a suitable detergent solution is applied to the softened coating. The substrate can be allowed to dry and new layers of the optional intermediate coating and the radiation curable coating can be applied to renew the floor finish.

The coatings of the invention typically will be sold in the form of a kit containing the optional intermediate coating, radiation curable coating and optional maintenance coating in containers (e.g., separate containers) together with suitable directions for carrying out the methods of the invention. If desired, the intermediate coating, radiation curable coating and maintenance coating can be packaged as concentrates intended to be mixed with water or another suitable diluting solvent at about a 15–40% solids level. Optionally the kit will include a container of the stripper. The stripper typically will be mixed with water or another suitable diluting solvent at about 5–30% by weight. The kit can also contain undercoat materials (e.g., leveling coatings) that can be applied to the substrate before application of the optional intermediate coating or the radiation curable coating, and overcoat materials (e.g., waxes) that can be applied atop the radiation curable coating or maintenance coat.

If desired, the coatings of the invention can be factory-applied to provide a jobsite-strippable floor coating atop a multi-piece flooring material. The flooring material pieces will have a top surface coated with a layer or layers of a jobsite-strippable radiation curable coating comprising an agent that imparts greater strippability to the cured coating. Such a coating can be a laminate employing an intermediate layer and radiation curable coating as described above. If desired, the side or bottom surfaces of the flooring pieces can be coated or partially coated with coatings of the invention.

The invention is further illustrated in the following non-limiting examples, in which all parts and percentages are by weight unless otherwise indicated.

EXAMPLE 1

150 mm square uncoated black vinyl composite floor tiles from Armstrong Tile were scratched with a nonwoven abrasive scrub pad (SCOTCH-BRITE™ green abrasive, 3M) until the tile surface was no longer shiny. A single thick coat containing 3.5 g of a waterborne acrylic floor finish (PADLOCK™, Ecolab Inc.) was applied to the scratched tiles at a 31% solids level and allowed to air dry to form a strippable intermediate coating. Each coated tile was placed in an oven for 15 minutes at 60° C. to insure that the intermediate coating was dry. Tiles coated only with this acrylic floor finish can readily be completely stripped (yielding a strippability rating of 7) in less than 10 minutes using Stripper A.

Three sets of the tiles were coated with a single thick overcoat containing 3.5 g of a UV curable coating. The base formulation for all three sets was made from the ingredients set out below in Table 1-1 and identified as the "Control Formulation":

TABLE 1-1

| Ingredient | Parts |
| --- | --- |
| VIAKTIN ™ VTE 6165 resin[1] | 52.00 |
| KLEBOSOL ™ 30N25 silica sol[2] | 10.00 |
| ETHYL CARBITOL ™ [3] | 6.30 |
| IRGACURE ™ 500 photoinitiator[4] | 2.60 |
| Wax 43N polymer emulsion[5] | 1.91 |
| Wax 325 polymer emulsion[5] | 0.64 |
| ZONYL ™ FSJ fluorosurfactant, 10%[6] | 0.45 |
| PI-35 defoamer[7] | 0.15 |
| Deionized water | 25.95 |

[1]Waterborne polyester urethane acrylate radiation curing resin, available from Solutia Inc.
[2]Available from Clariant Corp.
[3]Available from Union Carbide Corp.
[4]Available from Ciba-Geigy Company.
[5]Available from Emulsion Systems, Inc.
[6]Available from E. I. duPont de Nemours and Co.
[7]Available from Ultra Additives, Inc.

For the first two sets, the overcoat did not contain an agent. For the third set, the overcoat was prepared by adding 2% benzyl alcohol to the Control Formulation. This coating was identified as "Formulation 1". For all three sets, the coated tiles were passed through a UV curing apparatus at 6.1 meters per minute. The apparatus contained an H bulb mercury vapor lamp that provided UVA, UVB, UVC and UVV energy dosages of 0.2, 0.17, 0.02 and 0.08 $J/cm^2$, respectively as measured using a UV Power Puck™ (EIT Inc.).

Each of the three sets was then coated with five maintenance coats each containing 1.9 g of a UV curable coating. For the first set, the Control Formulation was used as the maintenance coat. For the second and third sets, Formulation 1 was used as the maintenance coat. Thus, the first set did not contain an agent in any of the seven applied layers (i.e., the intermediate coating, overcoat and maintenance coats). These tiles were identified as "Control 1". The second set contained an agent in five of the seven layers (i.e., the maintenance coats). These tiles were identified as "Example 1-1". The third set contained an agent in six of the seven layers (i.e., the overcoat and the maintenance coats). These tiles were identified as "Example 1-2".

A stripper composition was prepared by combining 75 wt. % benzyl alcohol, 7.5 wt. % diethylene glycol monobutyl ether, 7.5 wt. % dipropylene glycol N-butyl ether, 7.5 wt. % propylene glycol phenyl ether and 2.5 wt. % SURFONIC™ 24-9 ethoxylated alcohol (Huntsman Chemical) to form a concentrate, and combining 10 parts of the resulting concentrate with 3 parts monoethanolamine, 0.15 parts ZONYL™ FSJ fluorosurfactant (commercially available from E. I. duPont de Nemours and Co.) and 87 parts water. The resulting diluted stripper composition forms a pseudo-stable aqueous dispersion when stirred. Shortly after application of the diluted stripper composition to a surface, the composition undergoes phase separation to form a solvent layer containing primarily benzyl alcohol adjacent to the surface with a layer containing primarily water atop the solvent layer. The diluted stripper composition was identified as "Stripper A".

A 50 mm diameter by 38 mm high carbon steel cylinder with a weight of 571 grams was wrapped with a green nonwoven pad (SCOTCH-BRITE™ Floor Maintenance Disc, 3M). When rolled over a coated tile, the cylinder exerted a pressure of 2.8 kPa and mimicked the pressure applied by a standard electric floor burnisher. The coated tiles were placed on a level surface and flooded with a sufficient quantity of Stripper A to form a 50 mm diameter circular pool on the surface of the coated tiles. Stripper A was allowed to remain on the coated tiles for a 30 minute standing time. The cylinder was then rolled 10 times over each tile. The tiles were rinsed with tap water, blotted dry and their strippability rated according to the following scale:

Strippability Scale

1) No effect
2) Minimal chemical attack on coating
3) Moderate chemical attack on coating
4) Severe chemical attack on coating with onset of stripping
5) Incomplete strip (may strip completely in some areas, especially where coating was porous, but not in other areas. Coating is slightly soft or tacky)
6) Incomplete strip with softened coating in all areas
7) Complete strip Set out below in Table 1-2 are the identity of each coated tile, identity and amount of the agent (if any) contained in the first coat or maintenance coats, and the Strippability Rating for a 30 minute stripper standing time.

TABLE 1-2

| Tile | % Agent, First Coat | % Agent, Maintenance Coats | Strippability Rating |
| --- | --- | --- | --- |
| Control 1 | None | None | 3 |
| 1-1 | None | 2% | 6 |
| 1-2 | 2% | 2% | 6 |

The results in Table 1-2 show that tiles coated with a laminate coating composition containing an agent in the UV curable maintenance coats or in both the UV curable overcoat and in the UV curable maintenance coats exhibited much better strippability than tiles coated with a laminate coating composition that did not contain the agent. The tiles of Example 1-2 were observed to strip a bit more cleanly than the tiles of Example 1-1.

EXAMPLE 2

Using the method of Example 1, four scratched black vinyl composite tiles were coated with a single thick coat containing 3.5 g of PADLOCK finish at a 31% solids level and allowed to air dry and then oven dry to form a strippable intermediate coating. One of the tiles was overcoated with a single thick overcoat containing 3.5 g of the Control Formulation at a 32% solids level, and identified as "Control 2". The second tile was coated with a single thick overcoat containing 3.5 g of Formulation 1 at a 32% solids level, and identified as "Example 2-1". The third tile had the same overcoat and a maintenance coat containing 3.5 g Formulation 1 at a 32% solids level. This third tile was identified as "Example 2-2". The cured maintenance coat on this tile had a "grooved" appearance, due in part to the difficulties encountered in forming a thin coating from the relatively high viscosity maintenance coat. The Example 2-2 tile was set aside and not further tested. The fourth tile had the same overcoat as Example 2-1 and two 1.9 g maintenance coats formed by reducing the photoinitiator concentration of the Control Formulation to 1.6%, diluting with additional deionized water to provide a 20% solids level and then adding 2% benzyl alcohol as the agent. This maintenance coat was identified as "Formulation 2". The coated tile was identified as "Example 2-3". Formulation 2 exhibited a smooth appearance and good leveling when used as a maintenance coat on the tile of Example 2-3.

The Control 2, Example 2-1 and Example 2-3 coated tiles were evaluated for scratch resistance using a Gardner abrasion tester, available from Byk Gardner Inc. This test is performed by abrading each tile sample for 100 back and forth cycles across the surface of the coated tile using a SCOTCH-BRITE Floor Maintenance Disc mounted to project approximately 13 mm below the brush holder of the abrasion tester. Water was added to the surface of each tile after the second or third abrasion cycle. Following the completion of 100 cycles, the tile sample was removed from the machine, rinsed and dried. The gloss level after abrasion was evaluated according to the following scale:

Scratch Test Scale

1) No visible scratches—equivalent to a "no-wax" tile
2) Scattered surface scratches, with no loss in gloss at 90°
3) to 6) Surface scratching with increasing scratch density and gloss loss
7) Complete surface scratch covering with gloss loss
8) Complete film scratching—coating is worn away.

The Control 2, Example 2-1 and Example 2-3 coated tiles were evaluated for scuff resistance using a custom-built pendulum scuff tester. The tester had a 0.91 m long swinging arm with a rubber end that projected about 13 mm beyond the end of the arm. The arm and test tile were positioned so that the arm could be swung through an arc of 90° and would skid to a stop near the center of the tile. Two samples of each tile were tested, and scuff resistance was evaluated according to the following scale:

Scuff Test Scale

1) No visible mark on tile
2) Visible mark on tile
3) Visible mark on tile, light shadow
4) Visible mark on tile, moderate shadow
5) Visible mark on tile, heavy shadow Adhesion Loss Test The Control 2, Example 2-1 and Example 2-3 coated tiles were evaluated for coating adhesion by cross-hatching the coating with a blade to form a 7×7 grid containing 49 squares. A piece of SCOTCH™ No. 600 transparent tape (3M) was applied to the grid and removed. The number of squares exhibiting coating delamination was divided by the total number of squares to calculate the percent of adhesion loss.

Using the method of Example 1, The Control 2, Example 2-1 and Example 2-3 coated tiles were evaluated for strippability using Stripper A and a 20 minute standing time.

Set out below in Table 2 are the identity of the tested coated tiles, amount of the agent (if any) contained in the overcoat and maintenance coats, and the Scratch Test, Scuff Test, Adhesion Loss and Strippability Rating results.

TABLE 2

| Tile | % Agent, Overcoat | % Agent, Maintenance Coats (if any) | Scratch Test | Scuff Test | % Adhesion Loss | Strippability Rating |
|---|---|---|---|---|---|---|
| Control 2 | None | No Maintenance Coat | 5 | 2 | 3 | 7 |
| 2-1 | 2.0% | No Maintenance Coat | 6 | 3 | 0 | 7 |
| 2-3 | 2.0% | 2.0% | 4 | 3 | 19 | 7 |

The results in Table 2 show that good scratch resistance, scuff resistance, interlayer adhesion and strippability could be maintained following application of UV-curable maintenance coats to a UV-cured coating.

EXAMPLE 3

Using the method of Example 1, scratched black vinyl composite tiles were coated with a single thick coat containing 3.5 g of PADLOCK finish at a 31% solids level and allowed to air dry and then oven dry to form a strippable intermediate coating. Varying amounts of benzyl alcohol were added to the Control Formulation and then applied to the coated tiles as 3.5 g UV curable overcoats prepared with or without agent, followed by five 1.9 g UV curable maintenance coats containing various amounts of agent. Set out below in Table 3 are the identity of each coated tile, identity and amount of the agent (if any) contained in the overcoat, amount of agent contained in the maintenance coats, and the Strippability Rating for a 30 minute stripper standing time.

TABLE 3

| Tile | % Agent, Overcoat | % Agent, Maintenance Coats | Strippability Rating |
|---|---|---|---|
| 3-1 | None | 0.5% | 2 |
| 3-2 | 0.5% | 0.5% | 6 |
| 3-3 | None | 1.0% | 3 |
| 3-4 | 1.0% | 1.0% | 6 |
| 3-5 | None | 1.5% | 3 |
| 3-6 | 1.5% | 1.5% | 6 |

The results in Table 3 show significant improvements in the Strippability Rating of a laminate coating could be obtained even at very low agent addition levels. Inclusion of the agent in the overcoat was especially helpful.

EXAMPLE 4

Using the method of Example 1, scratched black vinyl composite tiles were coated with a single thick coat containing 3.5 g of PADLOCK finish at a 31% solids level and allowed to air dry and then oven dry to form a strippable intermediate coating. One half of each tile was coated with 1.75 g of the Control Formulation. Varying amounts of benzyl alcohol were added to the Control Formulation, and the resulting formulations were applied to the other half of two of the coated tiles as 1.75 g UV curable overcoats. Two samples coated with each formulation were evaluated as in Example 2, using a five minute stripper standing time.

Set out below in Table 4 are the identity of the tested coated tiles, amount of the agent (if any) contained in the overcoat, and the Scratch Test, Gloss Loss (decrease in the Scratch Test rating before and after carrying out the test), Scuff Test, Adhesion Loss and Strippability Rating results. The entries for the Control 4 tile are an average for the Control Formulation as applied to one half of all eight tested tile samples.

TABLE 4

| Tile | % Agent, Overcoat | Scratch Test | Gloss Loss | Scuff Test | % Adhesion Loss | Strippability Rating |
|---|---|---|---|---|---|---|
| Control 4 | None | 4 | 4.6 | 4 | 0 | 7 |
| 4-1 | 0.5% | 4.5 | 3.2 | 4 | 0 | 7 |
| 4-2 | 1.0% | 4.5 | 4.5 | 4.5 | 0 | 7 |
| 4-3 | 1.5% | 6 | 17.7 | 5 | 0 | 7 |
| 4-4 | 2.0% | 5 | 8.6 | 4.5 | 0 | 7 |

The results in Table 2 show that increased levels of the agent in the overcoat may provide a somewhat softer overcoat having a slightly higher susceptibility to scratching, but good properties in other respects.

EXAMPLE 5

Using the method of Example 1, scratched black vinyl composite tiles were coated with a single thick coat containing 3.5 g of PADLOCK finish at a 31% solids level and allowed to air dry and then oven dry to form a strippable intermediate coating. The tiles were next coated with a single thick coat containing 3.5 g of a UV curable topcoat containing 2% or 5% agent, made from the ingredients set out below in Table 5-1, and cured using the method of Example 1:

TABLE 5-1

| Ingredient | Parts, 2% Agent Formulation | Parts, 5% Agent Formulation |
|---|---|---|
| VIAKTIN ™ VTE 6165 resin | 50.94 | 50.94 |
| KLEBOSOL ™ 30N25 silica sol | 9.80 | 9.80 |
| ETHYL CARBITOL ™ | 6.17 | 6.17 |
| IRGACURE ™ 500 photoinitiator | 2.55 | 2.55 |
| Wax 43N polymer emulsion | 1.87 | 1.87 |
| Wax 325 polymer emulsion | 0.63 | 0.63 |
| ZONYL ™ FSJ fluorosurfactant, 10% | 0.44 | 0.44 |
| PI-35 defoamer | 0.15 | 0.15 |
| Deionized water | 25.42 | 22.42 |
| Agent | 2.00 | 5.00 |

Next, 0, 3 or 5 1.9 g maintenance coats containing 2% or 5% agent and made using the above formulations were applied to the coated tiles and cured using the method of Example 1. The tiles were evaluated using the methods of Example 2. Set out below in Table 5-2 are the identity of the tested coated tiles, the type and amount of agent (if any) contained in the overcoat and maintenance coats, and the Scratch Test, Gloss Loss, Scuff Test, Adhesion Loss and Strippability Rating results.

TABLE 5-2

| Tile | Agent | % Agent, Overcoat | No. of Maintenance Coats | % Agent, Maintenance Coats | Scratch Test | Gloss Loss | Scuff Test | % Adhesion Loss |
|---|---|---|---|---|---|---|---|---|
| Control | None | None | 0 | None | 6 | 5.5 | 4 | 5 |
| Control | None | None | 0 | None | | | | |
| Control | None | None | 3 | None | 5 | 4.3 | 4 | 1 |
| Control | None | None | 5 | None | 5 | 0.1 | 4 | 0 |
| 2-1 | Benzyl Alcohol | 2.0% | 0 | 2.0% | 5 | 7.5 | 4 | 0 |
| 2-2 | Benzyl Alcohol | 2.0% | 3 | 2.0% | 4 | 2.2 | 4 | 1 |
| 2-3 | Benzyl Alcohol | 2.0% | 3 | 2.0% | | | | |
| 2-4 | Benzyl Alcohol | 2.0% | 5 | 2.0% | 5 | 7.0 | 4 | 1 |
| 2-5 | Benzaldehyde | 2.0% | 0 | 2.0% | 5 | 9.2 | 4 | 0 |
| 2-6 | Benzaldehyde | 2.0% | 3 | 2.0% | 2 | 0.0 | 4 | 17 |
| 2-7 | Benzaldehyde | 2.0% | 5 | 2.0% | 4 | 2.2 | 5 | 22 |
| 2-8 | Benzyl Acetate | 2.0% | 0 | 2.0% | 6 | 10.4 | 4 | 18 |
| 2-9 | Benzyl Acetate | 2.0% | 0 | 2.0% | | | | |
| 2-10 | Benzyl Acetate | 2.0% | 3 | 2.0% | 3 | 0.4 | 4 | 1 |
| 2-11 | Benzyl Acetate | 2.0% | 5 | 2.0% | 2 | 0.0 | 3 | 21 |
| 2-12 | Benzyl Acetate | 5.0% | 0 | 5.0% | 6 | 14.2 | 5 | 0 |
| 2-13 | Benzyl Acetate | 5.0% | 3 | 5.0% | 4 | 2.5 | 4 | 0 |
| 2-14 | Benzyl Acetate | 5.0% | 3 | 5.0% | | | | |
| 2-15 | Benzyl Acetate | 5.0% | 5 | 5.0% | 5 | 1.4 | 3 | 0 |
| 2-16 | 1-Butanol | 2.0% | 0 | 2.0% | 5 | 6.2 | 4 | 32 |
| 2-17 | 1-Butanol | 2.0% | 0 | 2.0% | | | | |
| 2-18 | 1-Butanol | 2.0% | 3 | 2.0% | 4 | 0.3 | 5 | 6 |

TABLE 5-2-continued

| Tile | Agent | % Agent, Overcoat | No. of Maintenance Coats | % Agent, Maintenance Coats | Scratch Test | Gloss Loss | Scuff Test | % Adhesion Loss |
|---|---|---|---|---|---|---|---|---|
| 2-19 | 1-Butanol | 2.0% | 5 | 2.0% | 3 | 1.1 | 4 | 14 |
| 2-20 | 2-Butanol | 2.0% | 0 | 2.0% | 4 | 0.0 | 4 | 0 |
| 2-21 | 2-Butanol | 2.0% | 3 | 2.0% | 5 | 3.6 | 4 | 5 |
| 2-22 | 2-Butanol | 2.0% | 5 | 2.0% | 4 | 2.0 | 4 | 0 |
| 2-23 | Hexanol | 2.0% | 0 | 2.0% | 5 | 1.9 | 4 | 12 |
| 2-24 | Hexanol | 2.0% | 3 | 2.0% | 5 | 0.6 | 4 | 1 |
| 2-25 | Hexanol | 2.0% | 5 | 2.0% | 4 | 3.3 | 3 | 9 |
| 2-26 | Hexanol | 5.0% | 0 | 5.0% | 6 | 6.5 | 5 | 0 |
| 2-27 | Hexanol | 5.0% | 0 | 5.0% | | | | |
| 2-28 | Hexanol | 5.0% | 3 | 5.0% | 4 | 0.4 | 4 | 0 |
| 2-29 | Hexanol | 5.0% | 3 | 5.0% | | | | |
| 2-30 | Hexanol | 5.0% | 5 | 5.0% | 6 | 5.2 | 3 | 0 |
| 2-31 | 1-Octanol | 2.0% | 0 | 2.0% | 4 | 1.7 | 4 | 1 |
| 2-31 | 1-Octanol | 2.0% | 3 | 2.0% | 6 | 1.9 | 4 | 23 |
| 2-32 | 1-Octanol | 2.0% | 5 | 2.0% | 5 | 1.1 | 4 | 10 |
| 2-33 | t-Butyl Alcohol | 2.0% | 0 | 2.0% | 3 | 1.5 | 4 | 20 |
| 2-34 | t-Butyl Alcohol | 2.0% | 3 | 2.0% | 3 | 2.2 | 3 | 0 |
| 2-35 | t-Butyl Alcohol | 2.0% | 5 | 2.0% | 3 | 1.7 | 4 | 4 |
| 2-36 | t-Butyl Alcohol | 5.0% | 0 | 5.0% | 5 | 8.1 | 4 | 0 |
| 2-37 | t-Butyl Alcohol | 5.0% | 0 | 5.0% | | | | |
| 2-38 | t-Butyl Alcohol | 5.0% | 3 | 5.0% | 5 | 4.3 | 4 | 0 |
| 2-39 | t-Butyl Alcohol | 5.0% | 3 | 5.0% | | | | |
| 2-40 | t-Butyl Alcohol | 5.0% | 5 | 5.0% | 4 | 1.4 | 3 | 0 |
| 2-41 | Toluene | 2.0% | 0 | 2.0% | 3 | 1.8 | 3 | 41 |
| 2-42 | Propylene glycol | 2.0% | 5 | 2.0% | 4 | 1.7 | 3 | 0 |
| 2-43 | DOWANOL EPH[1] | 2.0% | 0 | 2.0% | 4 | 0 | 4 | 0 |
| 2-44 | DOWANOL EPH | 2.0% | 0 | 2.0% | | | | |
| 2-45 | DOWANOL EPH | 2.0% | 3 | 2.0% | 4 | 1.5 | 4 | 0 |
| 2-46 | DOWANOL EPH | 2.0% | 5 | 2.0% | 3 | 1.8 | 3 | 0 |
| 2-47 | DOWANOL TPM[2] | 2.0% | 0 | 2.0% | 3 | 0 | 4 | 0 |
| 2-48 | DOWANOL TPM | 2.0% | 0 | 2.0% | | | | |
| 20-49 | DOWANOL TPM | 2.0% | 3 | 2.0% | 4 | 1.7 | 4 | 0 |
| 2-50 | DOWANOL TPM | 2.0% | 5 | 2.0% | 5 | 0.8 | 3 | 0 |
| 2-51 | DOWANOL PPH[3] | 2.0% | 0 | 2.0% | 5 | 5.7 | 5 | 0 |
| 2-52 | DOWANOL PPH | 2.0% | 0 | 2.0% | | | | |
| 2-53 | DOWANOL PPH | 2.0% | 3 | 2.0% | 4 | 0.0 | 3 | 0 |
| 2-54 | DOWANOL PPH | 2.0% | 5 | 2.0% | 4 | 1.5 | 3 | 1 |

[1] Ethylene glycol phenyl ether (Dow Chemical Co.)
[2] Tripropylene glycol methyl ether (Dow Chemical Co.)
[3] Propylene glycol phenyl ether (Dow Chemical Co.)

The results in Table 5-2 show the use of a variety of agents in UV-curable coatings.

EXAMPLE 6

Using the method of Example 1, two scratched black vinyl composite tiles were coated with a single thick coat containing 3.5 g of PADLOCK finish at a 31% solids level and allowed to air dry and then oven dry to form a strippable intermediate coating. One of the coated tiles was coated with a single thick overcoat containing 6 g of ULTRA BRITE™ UV curable coating (Minuteman, Inc.), modified by adding 3.3% benzyl alcohol to the coating. A third scratched tile without any intermediate coating was coated with a single thick overcoat containing 6 g of unmodified ULTRA BRITE II™ UV curable coating. All three tiles were exposed to UV curing radiation using the method of Example 1. The cured tiles were evaluated as in Example 2, using a 30 minute stripper standing time.

Set out below in Table 6 are the identity of the tested coated tiles, a description of the coating layers, and the Strippability Rating results.

TABLE 6

| Run No. | Intermediate coating? | Agent? | Overcoat | 7 Point Scale Evaluation |
|---|---|---|---|---|
| 6-1 | No | No | ULTRA BRITE II | 2 |
| 6-2 | Yes | No | ULTRA BRITE II | 6 |
| 6-3 | Yes | Yes | ULTRA BRITE II | 7 |

The ULTRA BRITE II UV coating system was introduced in the US some time on or after Jul. 31, 2000, for use on tile and terrazzo floors. As shown in Table 6, if the UV curable coating is applied directly to vinyl tile (as is recommended by the manufacturer), a strip agent provides only minimal chemical attack on the cured coating, and the coating can not readily be removed by stripping. However, if the UV curable coating is applied atop an intermediate coating, strippability is improved. If the UV curable coating is modified by addition of an agent, strippability is improved yet again, and the coating strips quickly and cleanly.

Various modifications and alterations of this invention will be apparent to those skilled in the art without departing from the scope and spirit of this invention. It should be understood that this invention is not limited to the illustrative embodiments set forth above.

We claim:

1. A radiation curable coating comprising about 0.1 to about 15 weight percent of an agent or agents that impart greater strippability to the cured coating.

2. A coating according to claim 1 wherein the curable coating is waterborne.

3. A coating according to claim 2 further comprising inorganic particles.

4. A coating according to claim 1 wherein the agent enhances adhesion of a radiation curable maintenance coat to the cured coating.

5. A coating according to claim 1 wherein the agent comprises a chain transfer agent that reduces the molecular weight of the cured coating.

6. A coating according to claim 1 wherein the agent contains oxygen.

7. A coating according to claim 1 wherein the agent comprises an alcohol, ester, aldehyde or mixture thereof.

8. A coating according to claim 1 wherein the agent has at least one phenyl group in proximity to one or more hydroxyl or aldehyde groups.

9. A coating according to claim 1 wherein the agent comprises t-butyl alcohol, benzyl alcohol, benzaldehyde or a mixture thereof.

10. A coating according to claim 1 comprising about 0.5 to about 8 weight percent agent based on the weight of the curable coating.

11. A coating according to claim 1 wherein the cured coating can be removed using a stripper comprising benzyl alcohol.

12. A radiation cured coating atop a substrate wherein the uncured coating comprised about 0.1 to about 15 weight percent of an agent or agents that impart greater strippability to the cured coating.

13. A coating according to claim 12, comprising two or more coats of radiation cured coating, wherein the agent was present in at least one of the coats before cure.

14. A coating according to claim 13 wherein the agent was present in the coat closest to the substrate.

15. A coating according to claim 13 wherein the agent was present in all of the coats.

16. A coating according to claim 12 wherein the agent comprises a chain transfer agent that reduces the molecular weight of the cured coating.

17. A coating according to claim 12 wherein the agent contains oxygen.

18. A coating according to claim 12 wherein the agent comprises an alcohol, ester, aldehyde or mixture thereof.

19. A coating according to claim 12 wherein the agent has at least one phenyl group in proximity to one or more hydroxyl or aldehyde groups.

20. A coating according to claim 12 wherein the agent comprises t-butyl alcohol, benzyl alcohol, benzaldehyde or a mixture thereof.

21. A coating according to claim 12 wherein the uncured coating comprised about 0.5 to about 8 weight percent agent based on the weight of the curable coating.

22. A coating according to claim 12 comprising a readily strippable intermediate layer between the substrate and the radiation cured coating.

23. A coating according to claim 12 wherein the coating can be removed by applying to it a stripper composition comprising at least one polar solvent, allowing the stripper composition to contact the coating for sufficient time to soften the coating, and removing the softened coating from the substrate by mopping, vacuuming, mild abrasion or other measures that do not remove substantial portions of the substrate.

24. A coating according to claim 12 wherein the substrate comprises a floor.

25. A coating according to claim 24 wherein the substrate comprises a resilient flooring material.

26. A coating according to claim 25 wherein the substrate comprises vinyl or vinyl composite tiles.

27. A coating according to claim 24 wherein the substrate comprises a multi-piece flooring material.

28. A coating according to claim 27 wherein the substrate comprises wood.

29. A coating according to claim 12 comprising an acrylate, methacrylate, unsaturated polyester, vinyl ether, epoxy, urethane or mixture thereof.

30. A coating according to claim 29 comprising a UV cured aromatic urethane.

31. A coating according to claim 29 comprising a UV cured aliphatic polyester urethane.

32. A kit comprising a radiation curable coating material comprising an agent that imparts greater strippability to the radiation curable coating material after cure, and instructions for jobsite application of the material to installed flooring materials.

33. A kit according to claim 32 wherein the material comprises water.

34. A kit according to claim 32 wherein the agent comprises a chain transfer agent that reduces the molecular weight of the cured coating.

35. A kit according to claim 32 wherein the agent contains oxygen.

36. A kit according to claim 32 wherein the agent comprises an alcohol, ester, aldehyde or mixture thereof.

37. A kit according to claim 32 wherein the agent has at least one phenyl group in proximity to one or more hydroxyl or aldehyde groups.

38. A kit according to claim 32 wherein the agent comprises t-butyl alcohol, benzyl alcohol, benzaldehyde or a mixture thereof.

39. A kit according to claim 32 comprising about 0.1 to about 15 weight percent agent based on the weight of the material.

40. A kit according to claim 32 comprising about 0.5 to about 8 weight percent agent based on the weight of the material.

41. A kit according to claim 32 further comprising a readily strippable intermediate coating.

42. A kit according to claim 32 further comprising a stripper.

43. A kit according to claim 42 wherein the stripper comprises at least one polar solvent.

44. A kit according to claim 32 wherein the material comprises an acrylate, methacrylate, unsaturated polyester, vinyl ether, epoxy, urethane or mixture thereof.

45. A kit according to claim 32 wherein the material comprises a waterborne aromatic urethane.

46. A kit according to claim 32 wherein the material comprises a waterborne aliphatic polyester urethane.

47. A kit according to claim 32 further comprising a radiation curable maintenance coating material comprising the agent.

48. A method for applying a strippable coating to a substrate, comprising:
   a. coating the substrate with a radiation curable composition comprising about 0.1 to about 15 weight percent of an agent or agents that impart greater strippability to the composition after it is cured; and
   b. radiation curing the coating.

49. A method for applying a strippable coating to a substrate, comprising:
   a. coating the substrate with a radiation curable composition comprising an agent that imparts greater strippability to the composition after it is cured;
   b. radiation curing the coating;
   c. exposing the cured coating to wear and tear whereby the appearance of the cured coating deteriorates;
   d. applying to the cured coating one or more radiation curable maintenance coats comprising such agent; and
   e. radiation curing such maintenance coat or coats to restore the appearance of the cured coating.

50. A method for applying a strippable coating to a substrate, comprising:
   a. coating the substrate with a radiation curable composition comprising an agent that imparts greater sirippability to the composition after it is cured; and
   b. radiation curing the coating;
wherein the substrate comprises a plurality of pieces, the composition is factory-applied and radiation cured on the substrate pieces before the substrate pieces are installed at a jobsite, and the cured composition is stripped from and reapplied to the substrate at the jobsite after the substrate has been subjected to wear.

51. A method according to claim 48 wherein the agent comprises a chain transfer agent that reduces the molecular weight of the radiation cured coating.

52. A method according to claim 48 wherein the agent contains oxygen.

53. A method according to claim 48 wherein the agent comprises an alcohol, ester, aldehyde or mixture thereof.

54. A method according to claim 48 wherein the agent has at least one phenyl group in proximity to one or more hydroxyl or aldehyde groups.

55. A method according to claim 48 wherein the agent comprises t-butyl alcohol, benzyl alcohol or benzaldehyde.

56. A method according to claim 48 comprising about 0.5 to about 8 weight percent agent based on the weight of the composition.

57. A method according to claim 48 wherein the cured coating can be removed using a stripper comprising benzyl alcohol.

* * * * *

UNITED STATES PATENT AND TRADEMARK OFFICE
CERTIFICATE OF CORRECTION

PATENT NO.    : 6,558,795 B2
DATED         : May 6, 2003
INVENTOR(S)   : Keith E. Olson and Victoria Jeanne Jackson It is certified that error appears in the above-identified patent and that said Letters Patent is hereby corrected as shown below:

Column 4,
Line 53, delete "PPh" and insert therefor -- EPh --

Column 8,
Line 18, delete "DECADE$^{TM}$" and insert therefor -- DECADE 90$^{TM}$ --

Column 17,
Between tile numbers 2-48 and 2-50 in Table 5-2, delete "20-49 DOWANOL" and insert therefor -- 2-49 DOWANOL TPM --.

Column 22,
Line 8-9, delete "sirip-pability" and insert therefor -- strippability --

Signed and Sealed this

Twenty-eighth Day of June, 2005

JON W. DUDAS
*Director of the United States Patent and Trademark Office*